US012659524B2

(12) United States Patent
Hassler

(10) Patent No.: US 12,659,524 B2
(45) Date of Patent: *Jun. 16, 2026

(54) DATA FORWARDING IN A CONTENT DELIVERY NETWORK

(71) Applicant: Comcast Cable Communications, LLC, Philadelphia, PA (US)

(72) Inventor: Garey Hassler, Castle Pines, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 86 days.

This patent is subject to a terminal disclaimer.

(21) Appl. No.: 18/893,709

(22) Filed: Sep. 23, 2024

(65) Prior Publication Data

US 2025/0088680 A1 Mar. 13, 2025

Related U.S. Application Data

(63) Continuation of application No. 17/247,931, filed on Dec. 30, 2020, now Pat. No. 12,132,939.

(51) Int. Cl.
| | |
|---|---|
| *H04N 21/231* | (2011.01) |
| *H04N 21/2381* | (2011.01) |
| *H04N 21/2665* | (2011.01) |
| *H04N 21/6377* | (2011.01) |

(52) U.S. Cl.
CPC ... *H04N 21/23106* (2013.01); *H04N 21/2381* (2013.01); *H04N 21/2665* (2013.01); *H04N 21/6377* (2013.01)

(58) Field of Classification Search
CPC ......... H04N 21/23106; H04N 21/2381; H04N 21/2665; H04N 21/6377; H04N 21/47202; H04N 21/2225
USPC ....................................................... 709/231
See application file for complete search history.

(56) References Cited

U.S. PATENT DOCUMENTS

| | | | |
|---|---|---|---|
| 11,115,335 | B2 | 9/2021 | Yamagishi |
| 2009/0046717 | A1 | 2/2009 | Li |
| 2015/0081848 | A1 | 3/2015 | Willbanks |
| 2016/0119058 | A1 | 4/2016 | Wang |
| 2020/0329284 | A1 | 10/2020 | Denoual et al. |
| 2021/0185368 | A1 | 6/2021 | Hao et al. |

OTHER PUBLICATIONS

U.S. Appl. No. filed on Dec. 30, 2020, entitled "Data Forwarding in a Content Delivery Network", U.S. Appl. No. 17/247,931.

*Primary Examiner* — Adil Ocak
(74) *Attorney, Agent, or Firm* — BakerHostetler

(57) ABSTRACT

Systems, methods, and devices relating to data forwarding in a content delivery network are described herein. In a method, a cache server may receive a request for a first data object from a client device. The cache server may request for and receive the first data object from an origin server. The cache server may determine one or more rules, implemented at the Internet or transport layer of the cache server, configured to cause future data object(s), associated with the first data object, to be forwarded to the client device via the Internet or transport layer, as the case may be. The one or more rules may be additionally or alternatively configured to cause the future data object(s) to be sent to an application layer of the cache server for potential storage at the cache server.

24 Claims, 8 Drawing Sheets

500

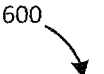

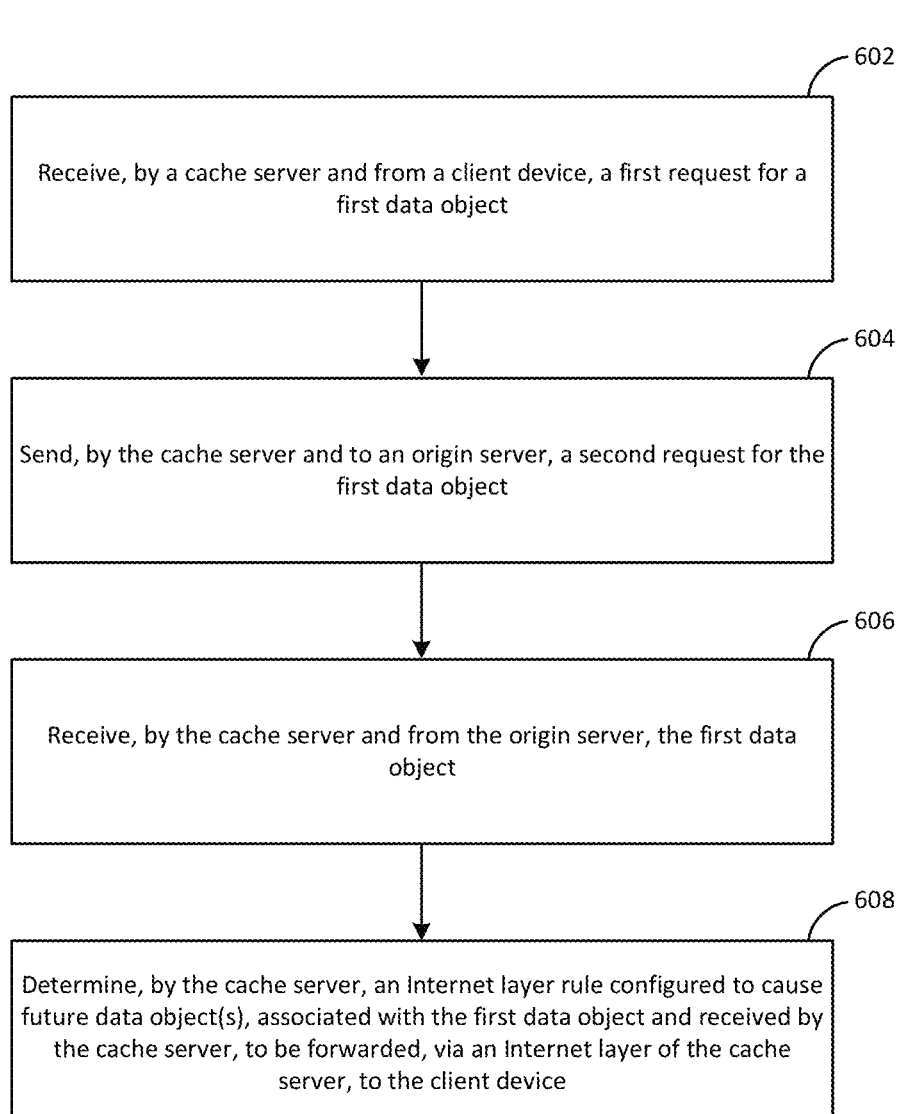

600

602

Receive, by a cache server and from a client device, a first request for a first data object

604

Send, by the cache server and to an origin server, a second request for the first data object

606

Receive, by the cache server and from the origin server, the first data object

608

Determine, by the cache server, an Internet layer rule configured to cause future data object(s), associated with the first data object and received by the cache server, to be forwarded, via an Internet layer of the cache server, to the client device

FIG. 6

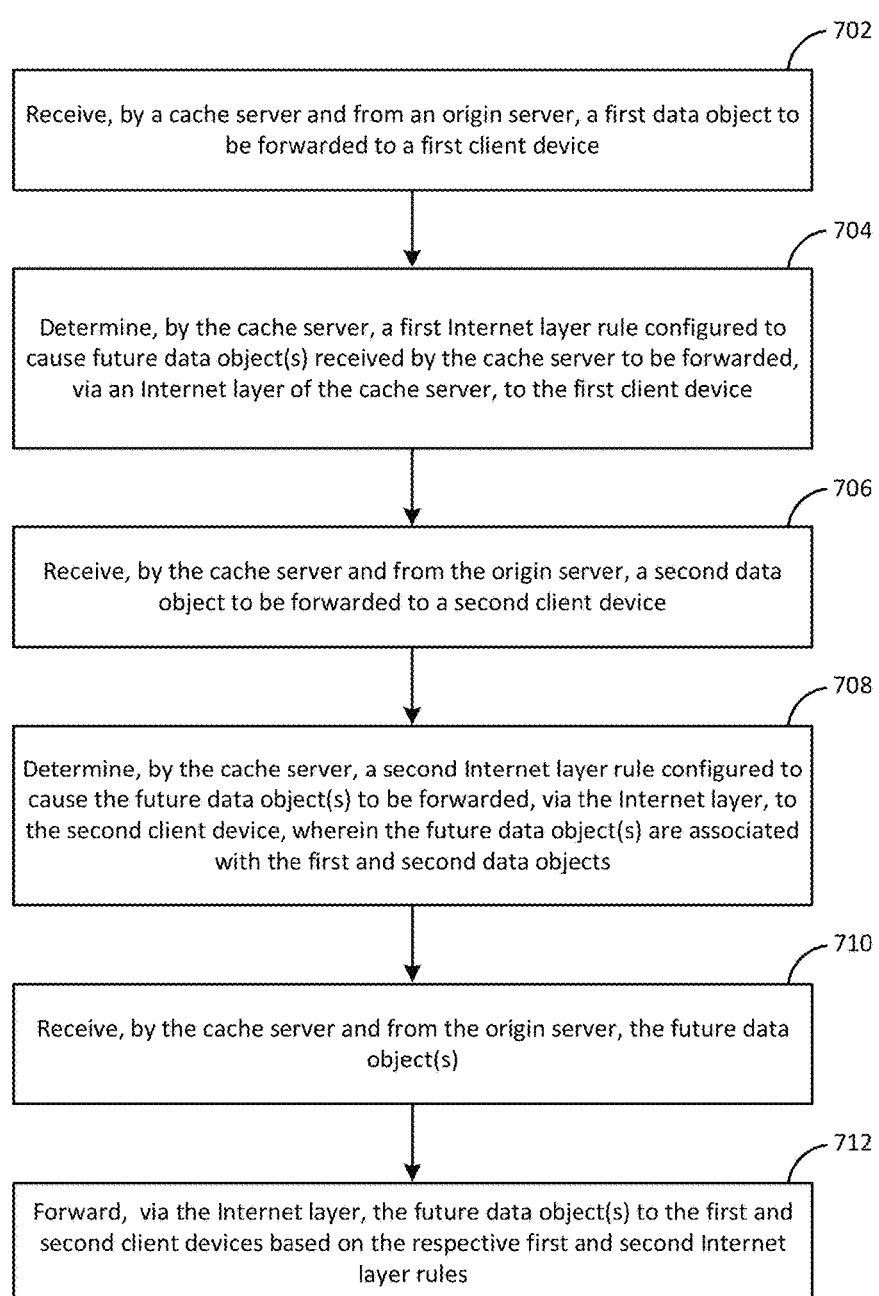

700

702

Receive, by a cache server and from an origin server, a first data object to be forwarded to a first client device

704

Determine, by the cache server, a first Internet layer rule configured to cause future data object(s) received by the cache server to be forwarded, via an Internet layer of the cache server, to the first client device

706

Receive, by the cache server and from the origin server, a second data object to be forwarded to a second client device

708

Determine, by the cache server, a second Internet layer rule configured to cause the future data object(s) to be forwarded, via the Internet layer, to the second client device, wherein the future data object(s) are associated with the first and second data objects

710

Receive, by the cache server and from the origin server, the future data object(s)

712

Forward, via the Internet layer, the future data object(s) to the first and second client devices based on the respective first and second Internet layer rules

FIG. 7

DATA FORWARDING IN A CONTENT DELIVERY NETWORK

CROSS-REFERENCE TO RELATED APPLICATIONS

This application is a continuation of U.S. application Ser. No. 17/247,931 filed Dec. 30, 2020, now U.S. Pat. No. 12,132,939, which is incorporated herein by reference in its entirety.

BACKGROUND

Digital video distribution has gained widespread use in recent years, including live and on-demand video streaming over both private digital networks and the open Internet. The high-speed (and high-volume) video data delivery needed to satisfy the demands of high-quality video streaming is enabled, at least in part, by the implementation of content delivery networks (CDNs). In a CDN, video data (as well as other types of data) is initially provided by an origin server. Rather than the origin server directly receiving and responding to requests for video data from client devices, a CDN is configured with a number of distributed cache servers that maintain copies of the video data, generally speaking (subject to updates or changes to the video data, distribution of new video data, etc.). The various cache servers may be distributed geographically, for example, to minimize the number of network hops between the contemplated client devices and the cache servers.

When a client device requests video data, the request is directed to a selected (e.g., geographically optimal and/or other optimization scheme) cache server. Assuming that the cache server already has a stored copy of the requested-for video data, the cache server responds to the request by transmitting the video data to the client device. In this manner, the video data is provided to the client device with an improved response time. In addition, the computational and network loads typically associated with directly receiving and responding to video data requests are off-loaded to the CDN and its cache servers, rather than being borne by the video content provider's system (e.g., origin server) itself. Other benefits may include improved load balancing and system redundancy.

Despite these advances, inefficiencies still remain in the use of CDNs to deliver video data (and/or other types of data), particularly at the cache servers. For example, there may be significant costs at each cache server hop in a CDN for receiving an object of video data, processing that object of video data, and sending that object of video data on to a client device (or other cache server, if the case may be). The costs are not only in terms of the server resources used at each cache server, but also in the overall latency time between when data is initially requested by a client device and when it is ultimately delivered. Where a CDN includes multiple tiers of cache servers, these costs are multiplied at each tier.

These and other shortcomings are addressed in the present disclosure.

SUMMARY

Systems, methods, and devices relating to data transmission in a content delivery network are described herein.

In a method, a cache server associated with a content delivery network may receive a first request (e.g., an HTTP request) for a first data object from a client device. For example, the client device may be configured for video output and the first data object may comprise a manifest file associated with a video stream. The client device may anticipate receiving back future data objects comprising video segments of the video stream. The cache server may send a second request (e.g., an HTTP request) for the first data object to an origin server and/or a second (upstream) cache server (e.g., a mid-tier cache server). For example, the cache server may not have the first data object in its storage and may instead request it from the origin server or second cache server so that the cache server may then send the first data object on to the first client device, as well as to other client devices that may request it. The cache server may receive the first data object from the origin server and/or second cache server, as the case may be.

The communication and processing functions of the cache server, as well as the origin server and the client device, may be organized or classified according to a multi-layer model, such as the Internet protocol suite model comprising a physical layer, a link layer (e.g., ethernet layer), an Internet layer (e.g., IP layer), a transport layer (e.g., TCP layer), and an application (e.g., HTTP server or client) layer. Based on the receiving the first data object (e.g., based on the upstream network interface port of the cache server that the first data object was received on), the cache server may determine one or more rules, implemented at the Internet layer of the cache server, configured to cause future data object(s) (e.g., video segments), received by the cache server and associated with the first data object, to be forwarded to the client device via the Internet layer of the cache server. For example, the cache server may forward the future data object(s), via the Internet layer, to a downstream network interface port associated with the client device, such as by writing a binary copy of the future data object(s) to the downstream network interface port.

In this manner, the cache server may avoid having to fully traverse up and back down the application layer and/or transport layer in forwarding the future data object(s) to the client device, thus conserving system resources and improving latency time. The one or more rules may additionally or alternatively cause the future data object(s) to be sent to an application on the application layer for potential storage at the cache server. It will be noted that processing at the application layer of the future data object(s) may be generally limited to the storage functions. Nor is it necessary that the future data object(s) traverse back down the layer stack from the application layer. Additionally or alternatively to the one or more (Internet layer) rules, the cache server may determine one or more (transport layer) rules that are configured to cause the future data object(s) to be forwarded to the client device via a transport layer of the cache server.

In another method, a cache server associated with a CDN may receive, from an origin server and/or a second (upstream) cache server, a first data object to be forwarded to a first client device. For example, the first data object may comprise a manifest file of a video stream. Based on receiving the first data object, the cache server may determine first one or more rules, implemented at the Internet layer of the cache server, configured to cause one or more future data objects received by the cache server to be forwarded to the first client device via the Internet layer of the cache server. The cache server may receive, from the origin server and/or the second cache server, a second data object to be forwarded to a second client device. The second data object may be associated with the first data object, such as a manifest file also associated with the above-noted video stream. For example, the respective users of the first and second client devices may both be set to watch the same video stream (e.g., the same television channel or program). Based on receiving the second data object, the cache server may determine second one or more rules, implemented at the Internet layer, configured to cause the one or more future data objects received by the cache server to be forwarded, via the Internet layer, to the second client device.

The one or more future data objects may be associated with both the first and second data objects. For example, the one or more future data objects may comprise one or more video segments of a video stream, and the first and second data objects may comprise manifest files associated with that video stream. The cache server may receive the one or more future data objects. Based on the respective first and second one or more rules, the cache server may forward the one or more future data objects to the first and second client devices. For example, the cache server may forward the video segments of the video stream to the first and second clients devices for viewer consumption.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

The accompanying drawings, which are incorporated in and constitute a part of this specification, illustrate embodiments and together with the description, serve to explain the principles of the systems, methods, and devices:

FIG. 6 is a flow diagram of an example method.

FIG. 7 is a flow diagram of an example method.

Aspects of the disclosure will now be described in detail with reference to the drawings, wherein like reference numbers refer to like elements throughout, unless specified otherwise.

DETAILED DESCRIPTION

Systems, methods, and devices relating to data forwarding in a content delivery network are described.

Figure 1:
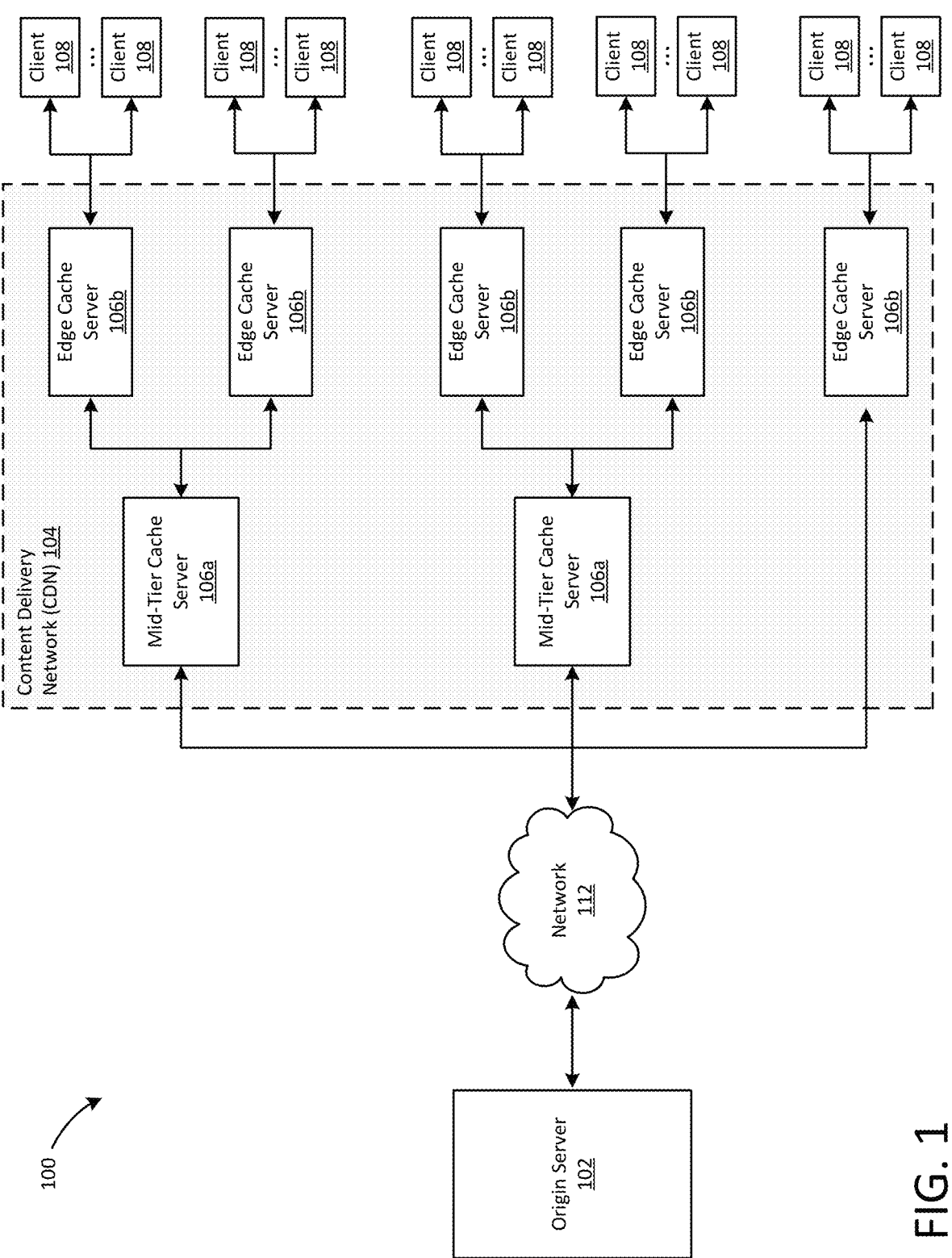
FIG. 1 is a block diagram of an example system.

FIG. 1 illustrates a block diagram of a system 100 in which the present systems, methods, and devices may be implemented. The system 100 may comprise an origin server 102 configured to transmit data (e.g., video data, audio data, or other types of data) to a content delivery network (CDN) 104 comprising one or more mid-tier cache servers 106a and one or more edge cache servers 106b (referred to generically as cache server(s) 106). A client 108 (i.e., client device) may request one or more data objects (e.g., a manifest file or a video segment) from an edge cache server 106b, such as when the client 108 initiates a video stream. If the edge cache server 106b has a requested data object, it may transmit that to the client 108. If it does not, the edge cache server 106b may proxy or relay the request to the origin server 102, which may respond by transmitting the data object to the edge cache server 106b. The edge cache server 106b, in turn, may transmit the data object to the client 108, as originally requested. The edge cache server 106b (or a cache server 106 generally) may further implement, according to the disclosed techniques, sub-application layer (e.g., the IP or TCP layer) tunneling for automatically forwarding, at the sub-application layer, data objects to clients 108. Such tunneling may be achieved, for example, via one or more sub-application layer forwarding rules generated at the edge cache server 106b.

While the disclosed techniques are often described in the context of video delivery, the disclosure is not so limited and these techniques may be similarly applied to any type of data, such as audio segments of an audio stream. It will be further understood that a video stream may comprise audio segments in addition to video segments. A manifest file associated with a video stream may indicate both video and audio segments.

The CDN 104 may be configured as a multi-tiered system comprising one or more mid-tier cache servers 106a, as shown in FIG. 1. A mid-tier cache server 106a may function similarly to an edge cache server 106b in a number of aspects (including sub-application layer forwarding), but may generally serve as an intermediate relay between an edge cache server 106b (or another mid-tier cache server 106a) and the origin server 102 (or another mid-tier cache server 106a), rather than interacting directly (with respect to the CDN 104) with a client 108. The components of the system 100 may communicate via a network 112.

It will be understood that the term "downstream" refers to communications, data flows, devices, servers, etc. going in the direction from the origin server 102 to the clients 108. That is, the left-to-right direction in FIG. 1 represents "downstream." For example, a client 108 is downstream from an edge cache server 106b, the edge cache server 106b (and the client 108, likewise) is downstream from a mid-tier cache server 106a, and the mid-tier cache server 106a (and the edge cache server 106b and client 108, likewise) is downstream from the origin server 102. Conversely, the term "upstream" refers to communications, data flows, devices, servers, etc. going in the direction from a client 108 to the origin server 102. That is, the right-to-left direction in FIG. 1 represents "upstream." For example, the origin server 102 is upstream of a mid-tier cache server 106a, the mid-tier cache server 106a (and the origin server 102, likewise) is upstream from an edge cache server 106b, and the edge cache server 106b (and the origin server 102 and mid-tier cache server 106a, likewise) is upstream from a client 108.

The origin server 102, the cache servers 106, and the clients 108 may be each configured to exchange data via HTTP, including one or more of HTTP/1.x or HTTP/2.x (including HTTP/2 Server Push). A client 108 may be configured with an HTTP client, such as a web browser configured for HTTP or a video processing application configured for HTTP. For example, a set-top box (e.g., a cable set-top box) or a functionally similar implementation may be configured with such an HTTP video processing application. The origin server 102 and the cache servers 106 may be configured with an HTTP web server application, although the particular web server application of the origin server 102 and the particular web server application(s) of the cache servers 106 may differ. This disclosure is not limited to HTTP, but may also encompass other application layer protocols or frameworks.

The respective functions of the origin server 102, the cache servers 106, and the clients 108 may be organized or performed according to an OSI (Open Systems Interconnection) model, such as the five layer model which is referred to variously in the literature as the Internet model, the Internet protocol suite, the five layer Internet model, the TCP/IP protocol suite, the TCP/IP five layer reference model, the TCP/IP model, or similar. Such a five layer model may comprise an application layer, a TCP (Transmission Control Protocol) (transport) layer, an IP (Internet Protocol) (Internet) layer, an ethernet (link) layer, and a physical layer. A transport layer may additionally or alternatively refer to UDP (User Datagram Protocol) and/or SCTP (Stream Control Transmission Protocol). Rather than the above five layer Internet model, a similar four layer Internet model may be used that does not per se include the physical layer in its scope and/or the physical layer is considered as part of the ethernet layer. In any case, the techniques described herein are equally applicable to both the five layer and four layer Internet models, as well as other types of multi-layer models. The multiple layers of a computing device may be referred to variously as a layer stack.

The example CDN 104 shown in FIG. 1 is a two-tier system, with the edge cache servers 106*b* as a first tier and the mid-tier cache servers 106*a* as a second tier. However, the CDN 104 may be additionally or alternatively configured with three or more tiers of cache servers 106. For example, in a three-tier CDN, a third tier comprising mid-tier cache servers 106*a* may be a national-level tier, a second tier comprising mid-tier cache servers 106*a* may be a state-level (or other sub-national-level) tier, and a first tier comprising edge cache servers 106*b* may be a local-level tier. Tiers of a CDN may be additionally or alternatively defined or organized according to the particular network topography of the Internet or relevant portion of the Internet, including the locations of various Internet points of presence (POP) and/or Internet exchange points (IX or IXP). Even in a multi-tier system, some edge cache servers 106*b* may still exchange data directly with the origin server 102, such as the bottommost edge cache server 106*b* shown in FIG. 1. Or more generally, a network path between a cache server 106 and the origin server 102 may hop over or bypass one or more cache tiers. Additionally or alternatively, the CDN 104 may be arranged as a one-tier system without any mid-tier cache servers 106*a*, such that the edge cache servers 106*b* exchange data directly with the origin server 102.

The origin server 102 may generally comprise one or more computing devices configured to process and respond to incoming internet requests for data (e.g., video data or other data relating to video delivery). The origin server 102 may refer to a single computing device or may refer collectively to two or more networked computing devices. External data storage accessible to the origin server 102, such as network-attached storage (NAS) or in a storage area network (SAN), may be considered as part of the origin server 102.

It is generally contemplated in the context of a CDN that data requests to the origin server 102 come from the cache servers 106 rather than clients 108 to minimize the total number of requests to the origin server 102 and provide better response latency, although the disclosure is not so limited. The origin server 102 may store data, such as the data requested by the client 108. The origin server 102 may store data associated with an adaptive bitrate video stream, such as multiple versions or profiles (e.g., with respect to bitrate) of the video content of the stream. The origin server 102 may also store data adjunct to video data, such as associated manifest files, authentication data, or website data (e.g., HTML, CSS, image, or script files). Such data may be stored at the origin server 102 or may be stored in external storage, such as network-attached storage (NAS) or in a storage area network (SAN). The origin server 102 may additionally or alternatively serve as a source for live video content and may transmit encoded video data as it is transcoded from a live video feed. This live video data may be considered as being stored at the origin server 102. The origin server 102 may comprise a "point of packaging" for a video stream.

The origin server 102 may be associated with a content distribution entity. For example, the origin server 102 may be associated with a multichannel video programming distributor (MVPD), such as a cable or satellite television provider system. The origin server 102 may be associated with a video streaming entity, such as a subscription-based video streaming platform or a video sharing/hosting platform. As another example, the origin server 102 may be associated with an audio streaming entity, such as a subscription-based or ad-supported audio streaming platform. As the disclosure is not limited to video data, the origin server 102 may be associated more generally with any digital content provider or publisher.

A client 108 may generally comprise any one of numerous types of devices configured to receive video data, such as an MPEG-2 transport stream, and decode the received video data for viewer consumption. A client 108 may request for and receive a manifest file or the like that is associated with a video stream. The client 108 may request the video data of the video stream according to the manifest file.

A client 108 may comprise a display device, such as a television display. A client 108 may comprise a computing device, such as a laptop computer or a desktop computer. A client 108 may comprise a mobile device, such as a smart phone or a tablet computer. A client 108 may be configured to receive video data and output the video data to a separate display device for consumer viewing. For example, a client 108 may comprise a set-top box, such as a cable set-top box. A set-top box may receive video data via a cable input (e.g., co-axial cable or fiber optic cable) and format the received video data for output to a display device. A set-top box may receive video data via digital video streaming. A set-top box (or other type of client 108) may comprise a quadrature amplitude modulation (QAM) tuner. A set-top box may comprise a digital media player or a gaming device. A client 108 may comprise a digital video recorder (DVR) that receives and stores video data for later viewing.

A client 108 may refer to a software "client" in addition to or instead of a hardware device. In this sense, for example, a client 108 may comprise a web browser, a media streaming application (e.g., installed on a mobile device), or the software installed in a set-top box. For example, a media streaming application may generate an HTTP request for video data, receive the subsequent HTTP response with the video data, and decode the video data for viewing.

As noted, the CDN 104 may comprise one or more cache servers 106, including one or more edge cache servers 106*b*. The CDN 104 may additionally or alternatively include one or more mid-tier cache servers 106*a* in a multi-tier CDN configuration. A cache server 106 may refer to a single computing device or may refer collectively to one or more networked computing devices. An edge cache server 106*b* may generally be a cache server that is directly (in the context of the CDN 104) accessible to a client 108 to receive requests for data from the client 108 and to ultimately transmit the requested-for data to the client 108. In the multi-tier CDN 104 shown in FIG. 1, one or more mid-tier cache servers 106*a* may serve as intermediate cache servers between the clients 108 and the origin server 102.

As an example data exchange, a client 108 may transmit a request for data (e.g., video segments or a manifest file) to an edge cache server 106*b*. The edge cache server 106*b* may already have the data stored, such as due to a previous request for the data from the same or other client 108 or due to previous propagation of the data to the various cache servers 106 by the origin server 102. If the edge cache server 106*b* has the requested data, the edge cache server 106*b* may transmit the data to the client 108. If the edge cache server 106*b* does not have the requested data, it may relay the request to an upstream mid-tier cache server 106*a*. Like at the initial edge cache server 106*b*, if the mid-tier cache server 106*a* has the requested data, it may transmit that to the edge cache server 106*b*, which may, in turn, transmit the data to the requesting client 108. Along with transmitting the data to the client 108, the edge cache server 106*b* may store the data in anticipation of further requests for the data from other clients 108.

The mid-tier cache server 106*a* may already have the data stored, for example, due to a previous request for the data or because the origin server 102 previously propagated the data to the mid-tier cache server 106*a*. If the mid-tier cache server 106*a* does not have the requested data, the mid-tier cache server 106*a* may transmit or relay the request for the data to the origin server 102. The origin server 102 presumably has the requested data and transmits it to the mid-tier cache server 106*a*. The mid-tier cache server 106*a* may store the data so that it may transmit the data in response to later requests from any downstream edge cache servers 106*b* (and/or as part of an HTTP/2 Server Push transaction (described below) with other downstream edge cache servers 106*b*). The mid-tier cache server 106*a* may transmit the data to the edge cache server 106*b* and the edge cache server 106*b* may transmit the data to the client 108. As above, the edge cache server 106*b* may also store the data for later transmission to other requesting clients 108 (and/or, as above, as part of an HTTP/2 Server Push transaction with other requesting clients 108).

The above example data exchange may be performed using HTTP/1 (i.e., HTTP/1.x). This functionality may be extended with the use of HTTP/2 (i.e., HTTP/2.x) instead of or in addition to HTTP/1, including the Server Push features of HTTP/2. As a compliment to the request/response methods of HTTP/1, HTTP/2's Server Push method preemptively pushes data to a client that is associated with the data that the client had initially requested. For example, based on a request from a client for a first data object, a server may respond with the first data object, but may also anticipate that the client will additionally need second and third data objects (which are associated with the first data object) and push the second and third data objects to the client before the client even requests the second and third data objects. For example, in the context of a video stream, the first data object may be a manifest file and the second and third data objects may be video segment files indicated in the manifest. Or, as another example, the first data object may be a segment N of a video stream and the second and third data objects may be segments N+1 and N+2, respectively. In the context of a webpage, for example, the first data object may be the index.html file for a webpage and the second and third data objects may be one or more of an image file, CSS file, script file, or other file referenced in the index.html file.

A cache server 106, including an edge cache server 106*b* and/or a mid-tier cache server 106*a*, may be configured to implement data forwarding according to the disclosed techniques. Generally, a cache server 106 may avoid at least some application layer processing of received data objects (as well as the received data objects not having to traverse both up and down each layer in the cache server's 106 layer stack) by automatically forwarding received data objects at a sub-application layer (e.g., the IP or TCP layer) to downstream client(s) 108 or other cache server(s) 106. The cache server 106 may configure such automatic forwarding once it has received an initial requested data object from the origin server 102 or another upstream cache server 106 (or determines that the cache server 106 already stores the data object). When the cache server 106 receives other subsequent data objects associated with the initial requested data object, such as data objects pushed via HTTP/2's Server Push method, the cache server 106 may automatically forward those subsequent data objects to the requesting client 108 at the sub-application layer. By automatically forwarding the subsequent data objects at the sub-application layer, the cache server 106 may be freed from having to process at the application layer each of the subsequent data objects to determine that the data object is to be sent to the requesting client 108, as well as performing the various steps (e.g., managing application layer I/O interrupts, TCP interrupts, etc.) to effect such transmissions. Nor would TCP buffering (in an IP layer example) be required in both traversing up the layer stack and back down the layer stack.

As a more specific example, a client 108 may transmit a request to a cache server 106 for a first data object. The cache server 106 may determine that it does not already store the first data object and may relay or send a request to the origin server 102 for the first data object. The origin server 102 may respond to the request by sending the first data object to the cache server 106. At the cache server 106, the first data object is passed up through the various sub-application layers (e.g., the ethernet, IP, and TCP layers) to the application layer. At the application layer, the application may cause the first data A to be stored at the cache server 106 and pass the data object down through the sub-application layers for transmission to the client 108. To effect subsequent sub-application layer forwarding, the application (and/or the cache server 106 generally) may generate a rule at a sub-application layer for forwarding subsequent data objects associated with the first data object. For example, the application layer may generate an IP layer rule by creating a new rule entry in iptables (e.g., in Linux) to forward subsequent data objects (e.g., associated with the first data object) to a specific port on a downstream network interface of the cache server 106, thereby delivering the subsequent data objects to the client 108. Additionally or alternatively, the rule may cause the subsequent data objects to be passed to the application layer for the application to store the data object at the cache server 106, if needed. A rule may be additionally or alternatively implemented on the TCP layer, as will be fully described herein.

After (or concurrently with) sending the first data object to the cache server 106, the origin server 102 may determine to send a second data object (which is associated with the first data object) to the client 108 via the HTTP/2 Server Push method. The origin server 102 may thus send the second data object to the cache server 106. As indicated above, the cache server 106 may now have the (port forwarding) rule associated with the client 108 and/or the first data object in place. Having received the second data object at the cache server 106, the second data object may begin to traverse up through the various layers of the cache server 106. Taking the above IP layer example, the rule may cause the second data object to be forwarded to the port on the downstream network interface indicated by the rule. The rule may also cause the second data object to continue to traverse the layers of the cache server 106 up to the application layer. The application may thus store the second data object at the cache server 106. However, the application does not need to process data the second object (and thus consume server resources) to determine that the second data object is to be sent to the client 108 and then cause such transmission. Nor is it necessary for the second data object to traverse down through any intermediate layers, such as the TCP layer in the IP layer example. This not only reduces the use of computational resources, but also the latency time in providing the second data object to the client 108. Additional subsequent data objects pushed from the origin server 102 may be handled in a similar manner at the cache server 106 as the second data object.

The above-described example may be extended to subsequent or concurrent requests (or server pushes) for the first, second, etc. data objects that are associated with other clients 108. For example, several clients 108 may receive a common video stream at generally the same time. When a second client 108 requests the first data object from the cache server 106, for example, the cache server 106 (e.g., the application) may generate a forwarding rule (e.g., in iptables in the above IP layer example) associated with the second client 108 that indicates for subsequent data objects (such as the second data object) to be forwarded at the sub-application layer to the second client 108. For example, the cache server 106 may receive the second data object as a server push from the origin server 102. Based on the respective rules for the initial and second clients 108, the cache server 106 may copy the second data object to the application at the application layer for the application to potentially store the second data object at the cache server 106. Also based on the rules, copies of the second data object may be written (e.g., "forked") to the respective downstream network interface ports indicated in the respective rules for the initial and second clients 108.

The network 112 may comprise a private portion. The network 112 may comprise a public portion, such as the Internet. The network 112 may comprise a content distribution and/or access network. The network 112 may comprise a cable television network or a content delivery network. The network 112 may facilitate communication via one or more communication protocols. The network 112 may comprise fiber, cable, or a combination thereof. The network 112 may comprise wired links, wireless links, a combination thereof, and/or the like. The network 112 may comprise routers, switches, nodes, gateways, servers, modems, and/or the like.

Figure 2:
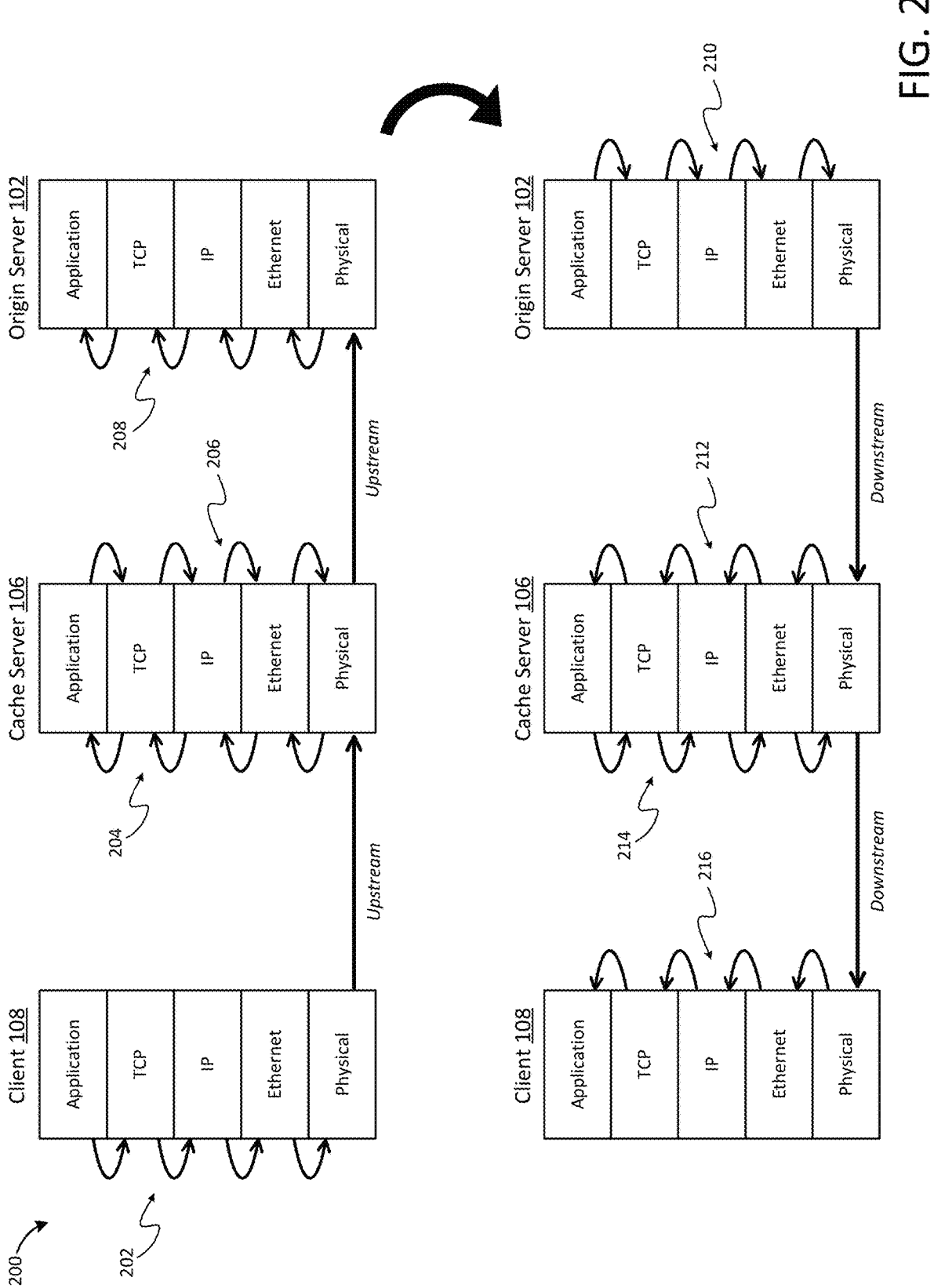
FIG. 2 is a block diagram of an example network data flow.

FIG. 2 illustrates an example network data flow diagram 200 showing a data flow between a client 108 (e.g., a client device), a cache server 106, and an origin server 102 of a CDN. The data flow shown in FIG. 2 may be performed according to the HTTP/1 approach. FIG. 2 depicts a single cache server 106, however it is also contemplated that there may be one or more additional cache servers 106 (e.g., mid-tier cache servers 106a) between the client 108 and the origin server 102, such as in the case of a multi-tier CDN. The client 108, the cache server 106, and the origin server 102 may be each configured according to a five layer model (e.g., the Internet protocol suite model) comprising, from the bottom of the layer stack to the top of the layer stack, a physical layer, an ethernet layer (or other type of link or data link layer), an IP layer (or other type of Internet layer), a TCP layer (or other type of transport layer), and an application layer. The various layers may be distinguished, for example, according to their respective protocols and/or encapsulation mechanisms. The precise implementation of the various respective layers amongst the client 108, the cache server 106, and the origin server 102 need not be identical. For example, the application at the application layer of the client 108 may be a web client (e.g., an HTTP web browser, such as Firefox or Chrome), while the application at the application layer of the cache server 106 and/or origin server 102 may be a web server application (e.g., an HTTP web server application, such as Apache HTTP Server or Nginx). As another example, the client's 108 application may additionally or alternatively comprise a video decoder/rendering application, while the origin server's 102 application may additionally or alternatively comprise a video encoder/transcoder application. The various arrows linking the layers in the respective layer stacks of the client 108, the cache server 106, and the origin server 102 represent the communication path of a data object as it traverses the layers.

Initially, an application on the client 108 generates a request (e.g., an HTTP request) for a data object. The requested data object may comprise a video segment of a video stream being viewed at the client 108, for example. As indicated generally by the stylized arrow 202, the request traverses down each layer of the client's 108 layer stack from the application layer to the physical layer. At the physical layer, the request is sent upstream to the cache server 106. As indicated generally by the stylized arrow 204, the request traverses up through each of the cache server's 106 layers to the application layer. At the application layer, the application processes the request. For example, the cache server's 106 application may determine that it does not store the requested data object and instead identifies the origin server 102 as a source for that data object. The cache server's 106 application may generate a request for the data object or relay the client's 108 initial request, which traverses back down through the cache server's 106 layer stack to the physical layer, as indicated generally by the stylized arrow 206. The request is sent upstream to the origin server 102. As indicated generally by the stylized arrow 208, the request traverses the origin server's 102 layer stack up to the application layer. There, the origin server's 102 application processes the request, such as to determine that it does store the requested data object and where it is located in its storage. The application generates a response comprising the data object. A response comprising a data object may be variously referred to herein as simply a data object.

The response (i.e., the data object) traverses down the origin server's 102 layer stack from the application layer to the physical layer, as indicated generally by the stylized arrow 210. At the physical layer, the origin server 102 sends the response to the cache server 106. The cache server 106 receives the response (which comprises the requested data object), which traverses up through the cache server's 106 layer stack from the physical layer to the application layer, as indicated generally by the stylized arrow 212. The cache server's 106 application processes the response, such as to store a copy of the data object at the cache server 106, determine that the data object is to be sent to the requesting client 108, and perform any necessary or otherwise beneficial operations (e.g., manage application-layer I/O interrupts, TCP interrupts, TCP buffering, etc.) to effect such a transmission. The application relays the response comprising the data object or generates a new response comprising the data object. As indicated generally by the stylized arrow 214, the response traverses down the cache server's 106 layer stack to the physical layer. At the physical layer, the cache server 106 sends the response to the client 108. The client 108 receives the response at its physical layer and the response traverses up through the various layers to the application layer, as indicated generally by the stylized arrow 216. At the application layer of the client 108, the application may process the response (i.e., the data object). For example, where the data object comprises a video segment, the application may decode and render the video segment for viewer consumption.

While the HTTP/1 approach for CDN data exchanges illustrated in FIG. 2 has proven useful in enabling many Internet services and technologies (and indeed still is), it is not without its drawbacks. For example, a data object (e.g., a response comprising the data object) received by the cache server 106 from the origin server 102 (or from another cache server 106) traverses through each layer up to the application layer where the data object is processed by the cache server's 106 application. The application must not only determine whether the data object should be stored at the cache server 106 (and subsequently store it, if appropriate), but also determine where the data object is to be sent and cause such a transmission to take place. This may include performing the necessary operations and functions for the data object to traverse down the layer stack, such as managing system interrupts, buffers, etc. The encapsulation/decapsulation functions used (whether by the application or as a system function) to move a data object between the layers also consumes server resources and time. This is typically repeated for each applicable data object received by the cache server 106, not only for the particular client 108 but also for numerous other clients 108 requesting the same and/or other data objects. Where a data object must pass through multiple cache servers 106, such as in a multi-tier CDN, the impact to server resources and latency times may be even more pronounced. Even when using HTTP/2's server push techniques, it may still typically be required for the data object to fully traverse up and down each of the cache server's 106 layers-along with the associated processing by the application and system-in order for the cache server 106 to send the data object to the client 108.

Figure 3:
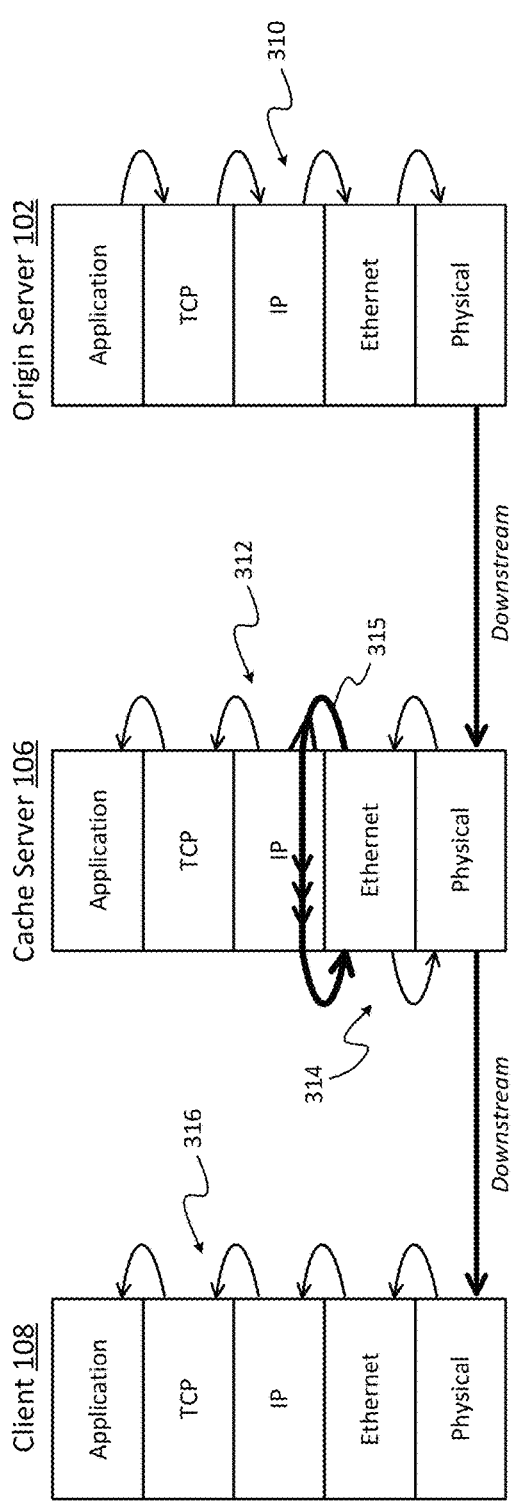
FIG. 3 is a block diagram of an example network data flow.

FIG. 3 illustrates an example network data flow diagram 300 showing a data flow between a client 108 (e.g., a client device), a cache server 106, and an origin server 102 of a CDN according to the techniques described herein. The mode of presentation is generally the same as that of FIG. 2. The data flow shown in FIG. 3 is generally associated with an IP layer approach. Although FIG. 3 depicts a single-tier CDN, similar techniques may be applied in a multi-tier CDN. Similar techniques may also be applied where there are multiple clients 108, such as where multiple clients 108 are each receiving common data objects from the cache server 106 and/or origin server 102. Like in FIG. 2, the client 108, the cache server 106, and the origin server 102 may be each configured according to a five layer model (e.g., the Internet protocol suite model) comprising, from the bottom of the layer stack to the top of the layer stack, a physical layer, an ethernet layer (or other type of link or data link layer), an IP layer (or other type of Internet layer), a TCP layer (or other type of transport layer), and an application layer. The various arrows linking the layers in the respective layer stacks of the client 108, the cache server 106, and the origin server 102 represent the communication path of a data object as it traverses the layers.

With respect to FIG. 3, the client 108 may have previously sent a request for a data object (or other type of request) to the origin server 102 (e.g., via the cache server 106). Based on the request, the origin server 102 may have sent the requested data object to the cache server 106 and the cache server 106 may have sent the data object to the client 108. Further based on the request, the origin server 102 may have determined to send one or more additional (e.g., future) data objects, associated with the initial requested data object, to the client 108. For example, the origin server 102 may have initiated an HTTP/2 server push method to send one or more additional data objects to the client 108 via the cache server 106. In the context of video delivery, for example, the client 108 may have initially requested a manifest file associated with a video stream. Based on the request, the origin server 102 may have sent the manifest file to the client 108 via the cache server 106 and determined to send additional data objects associated with the manifest file and/or video stream (e.g., video segments, which may have been identified in the manifest file). The origin server 102 may have sent, via the cache server 106, an HTTP/2 PUSH_PROMISE frame indicating the additional data objects to the client 108, for example.

In addition, the cache server 106 may be already configured to forward future data objects (associated with the client 108 and the above-noted data object initially requested by the client 108) to the client 108 at the IP layer of the cache server 106. In addition, the cache server 106 may be already configured to pass the future data objects to its application layer for potential storage. Such a configuration of the cache server 106 may have been based on the cache server 106 (e.g., the application of the cache server 106) receiving the initial data object from the origin server 102. Additionally or alternatively, such a configuration of the cache server 106 may have been based on the cache server 106 (e.g., the application of the cache server 106) receiving the HTTP/2 PUSH_PROMISE frame (or similar message) indicating that the origin server 102 will be sending the additional data objects. For example, based on receiving the initial data object and/or the HTTP/2 PUSH_PROMISE frame, the cache server 106 (e.g., the application on the cache server 106) may have generated an IP layer rule (or similar construct or mechanism) associated with the client 108 to cause future data objects to be forwarded in the IP layer (e.g., as a binary copy, or bcopy in Linux) to an indicated port on the downstream network interface of the cache server 106 and to cause the future data object to be passed to the application in the application layer for potential storage at the cache server 106. The IP layer rule may indicate the particular client 108 (e.g., by IP address) that is to receive the future data objects and the network interface port that the additional data objects are to be copied to. The IP layer rule may also indicate a stream ID for one or more of the future data objects, which may have been indicated in an earlier HTTP/2 PUSH_PROMISE frame from the origin server 102.

As indicated above, the application (e.g., HTTP web server application) at the application layer of the origin server 102 may determine to send a (future) data object to the client 108, such as via the HTTP/2 server push method. The application may cause the data object to traverse down the layer stack of the origin server 102, as indicated generally by the stylized arrow 310. The data object is sent to the cache server 106 at the origin server's 102 and cache server's 106 respective physical layers.

The cache server 106 receives the data object at its physical layer. The upward traversal of the data object through one or more layers of the cache server 106 is indicated generally by the stylized arrow 312.

The data object is passed, via the ethernet layer, from the physical layer to the IP layer of the cache server 106. At the IP layer, based on the above-described configuration of the cache server 106 (e.g., the IP layer rule already in place for the particular client 108 and future data objects associated with the initial requested data object), the instant data object is forwarded to a pre-defined port of the downstream network interface of the cache server 106, as indicated by the bolded arrow 315. For example, an exact copy of the data object may be written (e.g., as a binary copy) to the pre-defined port of the downstream network interface. The pre-defined port may be indicated in the IP layer rule associated with the client 108 and/or the initial requested data object. After being forwarded via the IP layer, the data object is traversed from the IP layer down to the physical layer, as indicated generally by the stylized arrow 314. It will be noted that writing the copy of the data object to the port of the downstream network interface may be performed at the kernel/driver level, thereby avoiding at least some of the higher level processing, functions, operations, etc. that would otherwise be required for the data object to be traversed both up and down through the TCP and application layers.

In addition to forwarding the data object in the IP layer, the data object may be also sent to the application in the application layer of the cache server 106, as further indicated by the stylized arrow 312. This action may be based on the IP layer rule (e.g., specified in the IP layer rule). The data object may be sent to and/or arrive at the application after the data object is forwarded at the IP layer. As noted, forwarding the data object at the IP layer occurs at the kernel/driver level and thus may be performed more quickly than traversing the data object up the layer stack to the application layer. For example, the data object may have already been forwarded to the client 108 via the cache server's 106 IP layer before the data object is traversed to the application layer and/or before the application processes the data object. At the application layer, the application may determine whether the data object should be stored at the cache server 106, such as determining whether the data object is already stored at the cache server 106. If the cache server 106 does not already have the data object, the application may cause the data object to be stored at the cache server 106. Besides this process for storing the data object at the cache server 106, it is contemplated that the application does not process or otherwise act upon the data object. Rather, the data object is forwarded in the IP layer to the appropriate outgoing network interface port of the cache server 106.

In some instances, the data object is not sent to the application at the application layer and/or only a portion of the data object is sent to the application. In these or similar cases, signaling/messaging data associated with the data object may still be sent to the application at the application layer. The IP layer rule, for example, may indicate for the signaling/message data to be sent to the application. Signaling/messaging data associated with the data object may indicate, for example, the source (i.e., the origin server 102) and destination (i.e., the client 108) of the data object, such as via their respective IP addresses, as well as any timing information. For example, the signaling/messaging data associated with the data object may be based on or indicated in header and/or trailer information associated with the data object. Additionally or alternatively, the header and/or trailer information (or portion thereof) associated with the data object may be sent to the application layer as the signaling/messaging data. The signaling/messaging data may be used by the application to track the data objects that are forwarded from the origin server 102 to the client 108.

The data object is sent by the cache server 106 to the client 108 via their respective physical layers. At the client 108, the data object traverses up the layer stack to the application at the application layer. The application may process the data object and perform any operations or functions accordingly. For example, where the data object comprises a video segment of a video stream, the application may decode the video segments and cause output of the decoded video segment for viewer consumption.

Although FIG. 3 refers generally to a single particular client 108, it is contemplated that similar operations may be performed (e.g., concurrently) by the cache server 106 with respect to additional clients 108. These additional clients 108 may be set to concurrently receive the same (additional) data objects as the particular client 108 shown in FIG. 3. For example, multiple clients 108 may be viewing the same video stream and it would be expected that the clients 108 all receive the same video segments from the origin server 102 at approximately the same time. For example, the video stream may be a live video stream and the origin server 102 may push the video segments as they are transcoded from the live source. However, it is additionally or alternatively contemplated that at some clients 108 may receive some data objects at different times. In addition, the set of clients 108 receiving a sequence of successive data objects may change over time, with new clients being added when they begin to receive the sequence of data objects and other clients dropping from the set when they stop receiving the sequence of data objects (e.g., their connection or session is closed).

To provide an incoming data object to each of the multiple clients 108, the cache server 106 may be (already) configured to forward ("fork") future data objects to each of the clients 108 at the IP layer of the cache server 106. The forwarding the data object to the multiple clients 108 at the IP layer is visually represented in FIG. 3 in the several "tines" in the portion of the bolded arrow 315 leading to the IP layer. For example, the cache server 106 may, for each client 108, write a copy of the data object to a downstream network interface port associated with that client 108. The cache server 106 may maintain, for each of the clients 108, an IP layer rule that identifies that client 108 (e.g., via the IP address of the client 108) and the downstream network interface port associated that client 108.

Like with the initial client 108 shown in FIG. 3, the IP layer rule for the other clients 108 may have already been generated by the cache server 106 by the time the cache server 106 receives the (additional) data object. For example, the cache server 106 (e.g., the application on the cache server 106) may have generated the IP layer rule for an additional clients 108 based on a first data object received from the origin server 102 that was initially requested by that client 108, such as a video stream manifest file requested by that client 108. In this manner, as the multiple clients 108 each request a "first" data object and the cache server 106 receives the respective first data objects from the origin server 102, the cache server 106 (e.g., the application on the cache server 106) may build up a table or set of IP layer rules associated with the respective clients 108 (e.g., rule entries in Linux's iptables). When a future data object (e.g., the next video segment in a video stream) is received by the cache server 106, the cache server 106 may cause the data object to be sent to each of the multiple clients by forwarding the data object at the IP layer to the downstream network interface port indicated in the respective IP layer rules for the clients 108. For example, the cache server 106 may write a copy of the data object at the IP layer to each of the indicated network interface ports. The copy of the data object may be then sent from that network interface port to the corresponding client 108. If a client 108 closes the connection or session, or it is otherwise terminated, the IP layer rule associated with that client 108 may be removed.

Figure 4:
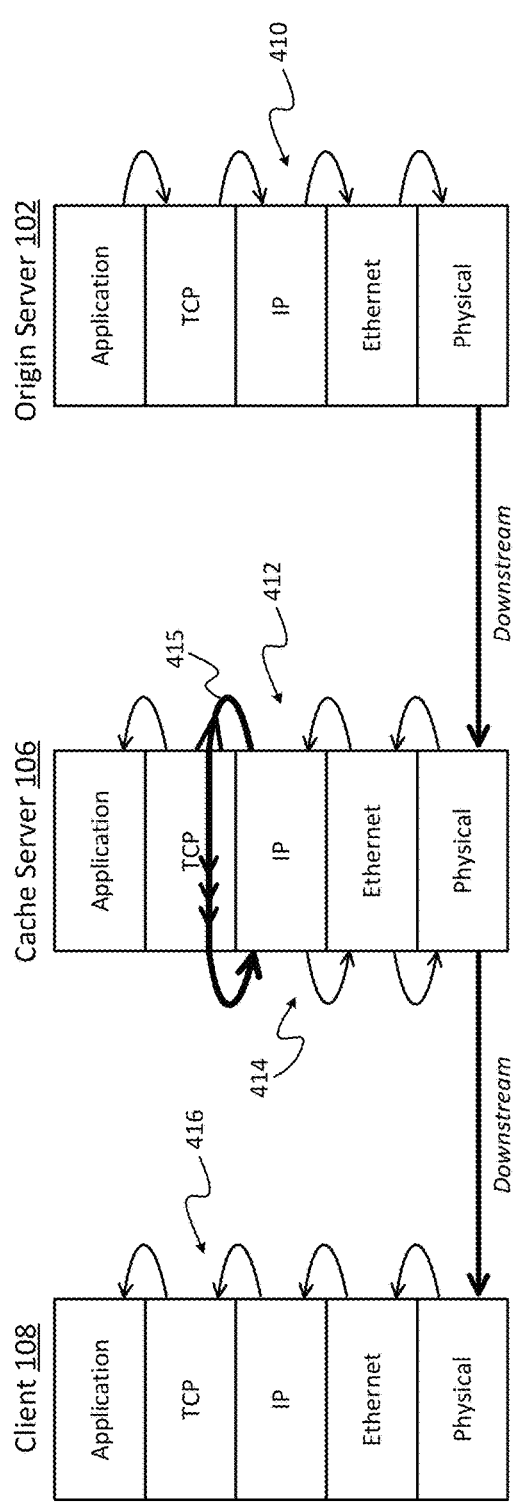
FIG. 4 is a block diagram of an example network data flow.

FIG. 4 illustrates an example network data flow diagram 400 showing a data flow between a client 108 (e.g., a client device), a cache server 106, and an origin server 102 of a CDN according to the data delivery techniques described herein. The mode of presentation is generally the same as that of FIGS. 2 and 3. The data flow shown in FIG. 4 is generally associated with a TCP layer approach. Although FIG. 4 depicts a single-tier CDN, similar techniques may be applied in a multi-tier CDN. Similar techniques may also be applied where there are multiple clients 108, such as where multiple clients 108 are each receiving common data objects from the cache server 106 and/or origin server 102. Like in FIGS. 2 and 3, the client 108, the cache server 106, and the origin server 102 may be each configured according to a five layer model (e.g., the Internet protocol suite model) comprising, from the bottom of the layer stack to the top of the layer stack, a physical layer, an ethernet layer (or other type of link or data link layer), an IP layer (or other type of Internet layer), a TCP layer (or other type of transport layer), and an application layer. The various arrows linking the layers in the respective layer stacks of the client 108, the cache server 106, and the origin server 102 represent the communication path of a data object as it traverses the layers.

Like with FIG. 3, the client 108 may have previously requested an earlier data object from the origin server 102 and the origin server 102 may have sent the earlier data object to the cache server 106 for further delivery to the client 108. Based on the request for the earlier data object, the origin server 102 may have determined to send additional (e.g., future) data objects to the cache server 106 for further delivery to the client 108, such as via HTTP/2 server push methods. For example, the origin server 102 may have sent an HTTP/2 PUSH_PROMISE frame to the cache server 106 for further delivery to the client 108. Based on the earlier data object and/or HTTP/2 PUSH_PROMISE frame received from the origin server 102, the cache server 106 may have generated a rule at the TCP layer, associated with the client 108 and the earlier data object (e.g., via a stream ID), to cause future data objects addressed to the client 108 to be forwarded, at the TCP layer, to a specified port on a downstream network interface of the cache server 106, as well as being forwarded to the application for potential storage. Also based on the earlier data object and/or HTTP/2 PUSH_PROMISE frame, the cache server 106 may be configured to pass, for each future data object and/or PUSH_ PROMISE frame, a new TCP parameter into the TCP processing layer that indicates the HTTP/2 stream ID associated with the earlier data object, which may be used to adjust the header (e.g., HTTP header) information in the future data object and/or PUSH_PROMISE frame. Adjusting the header information may comprise incrementing the HTTP/2 stream ID in the header information (e.g., incrementing by 2, as per the HTTP/2 specification). In some instances, depending on a particular HTTP/2 implementation or library, it may be possible to reuse the same stream ID for all future data objects from the origin server 102 that are addressed to the client 108.

At the origin server 102, the application (e.g., an HTTP web server application) may determine to send a (future) data object to the client 108, such as via the HTTP/2 server push method. The application may cause the data object to traverse down the layer stack of the origin server 102, as indicated by the stylized arrow 410. The data object may, in turn, be sent to the cache server 106.

At the cache server 106, the data object may be traversed up the layer stack, indicated generally by the stylized arrow 412, to the TCP layer. At the TCP layer, and based on a previously-generated TCP layer rule associated with the client 108 and/or the initial data object previously requested by the client 108, the data object may be forwarded to a port of a downstream network interface of the cache server 106, as indicated by the bolded arrow 415. For example, the TCP layer rule may indicate or pass a TCP parameter that indicates the HTTP/2 stream ID of the instant connection between the cache server 106 and the client 108. The TCP layer (e.g., the TCP layer rule) may modify the header information in the data object by incrementing the HTTP/2 stream ID (e.g., incrementing by 2). In addition to forwarding the data object at the TCP layer to the downstream network interface port, the data object (or copy thereof) may be forwarded to the application at the application layer. The TCP layer rule may cause the data object to be forwarded to the application, for example. Forwarding the data object to the application layer may be performed after the data object is forwarded via the TCP layer. For example, the data object may have been forwarded to the client 108 via the TCP layer before the data object is processed by the application. At the application layer, the application may determine whether the data object should be stored at the cache server 106, such as if the cache server 106 does not already have a stored copy of the data object. If so determined, the application may store the data object at the cache server 106. Alternatively, signaling/messaging data associated with the data object may be sent to the application layer without the data object being sent to the application layer or with only a portion of the data object being sent to the application layer (e.g., without the data object payload). Such signaling/messaging data may be based on or indicated in header and/or trailer information associated with the data object, for example. The signaling/messaging data may be used by the application to track the data objects that are forwarded from the origin server 102 to the client 108.

After the data object is forwarded at the TCP layer, the data object is traversed down the layer stack of the cache server 106, as indicated generally by the stylized arrow 414. The data object is then sent to the client 108 at the physical layer. It will be noted that, aside from potentially storing the data object, the application on the cache server 106 did not have to process or otherwise act upon the data object, thereby saving server resources and latency time that would otherwise have been incurred if the data object was processed at the application layer.

The client 108 receives the data object and the data object is traversed up through the client's 108 layer stack, as indicated generally by the stylized arrow 416. At the application layer, the client's 108 application may process the data object. For example, where the data object is a video segment of a video stream, the application may decode the video segment and cause the decoded video segment to be output for viewer consumption.

As with the IP layer approach described in relation to FIG. 3, the TCP layer approach may be extended to accommodate multiple clients 108, such as additional clients 108 that are concurrently receiving the same data object(s) as the initial client 108 shown in FIG. 4. For example, the multiple clients 108 may be each receiving a common video stream, such as a video stream associated with a particular television channel or network. When a data object is pushed or otherwise sent from the origin server 102 to the cache server 106 for downstream distribution to the clients 108, the data object may be forwarded ("forked") at the cache server's 106 TCP layer to the appropriate downstream network interface ports associated with the respective clients 108. For example, a TCP layer rule may have been previously generated for each of the clients 108 and the data object may have been forwarded at the TCP layer according to the respective TCP layer rules. The TCP layer rules for the multiple clients may have been generated based upon an earlier data object that was requested by the client 108 and received by the cache server 106 (and/or based on a PUSH_PROMISE message for a data object associated with the requested data object). The "tines" in the initial portion of the bolded arrow 415 visually represent the data object being concurrently forwarded ("forked") at the TCP layer. In addition to forwarding the data object at the TCP layer to the downstream network interface ports associated with the respective clients 108, the data object (or copy thereof) may be forwarded to the application at the application layer. The application may determine whether to store the data object at the cache server 106, and do so if appropriate. The data object may be forwarded to the application only a single time, regardless of whether the data object is forwarded to more than one downstream network interface port.

Figure 5:
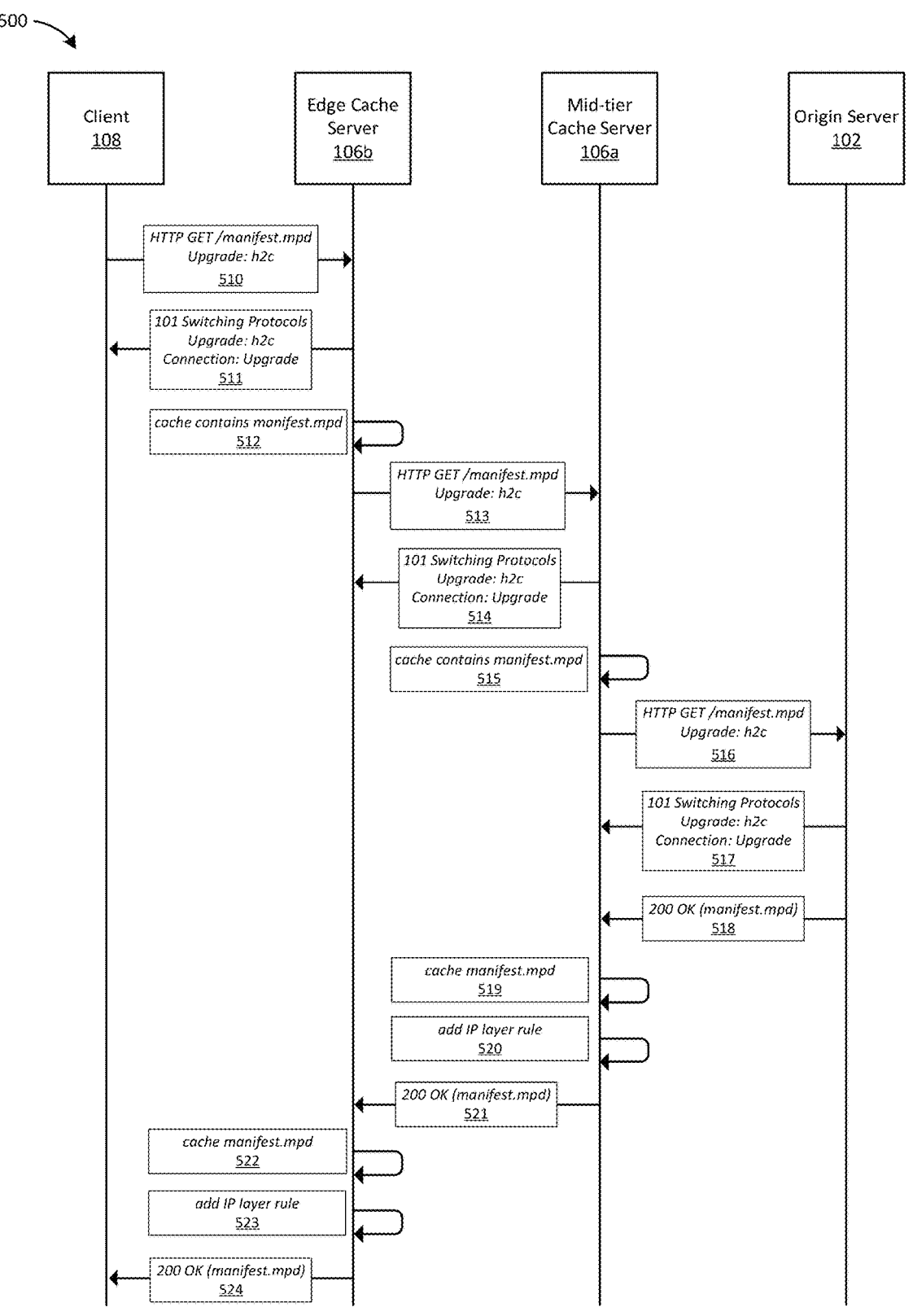
FIG. 5 is a sequence diagram of an example network data flow.

FIG. 5 illustrates an example sequence diagram 500 showing various data and message flows between a client 108 (e.g., client device), an edge cache server 106b, a mid-tier cache server 165a, and an origin server 102. The sequence diagram 500 generally shows an example process by which forwarding rules are generated at the edge cache server 106b and the mid-tier cache server 106a. The forwarding rules in this example are IP layer rules, but the concepts and techniques are equally applicable to TCP layer rules. For example, a TCP layer rule may be generated, according to the techniques described herein, at blocks 520 and 523 instead of an IP layer rule. The sequence diagram 500 is presented in the context of a video stream, although the disclosure is not so limited.

At block 510, the client 108 sends an HTTP GET request message for a manifest file ("manifest.mpd") to the edge cache server 106b. The manifest file may be for a video stream that the client 108 wishes to initiate. The HTTP GET request message also indicates for the connection with the edge cache server 106b to be upgraded from HTTP/1 to HTTP/2 ("Upgrade: h2c"). At block 511, the edge cache server 106b returns a "101" response message to indicate that the connection between the edge cache server 106b and the client 108 is upgraded to HTTP/2 ("101 Switching Protocols Upgrade: h2c Connection: Upgrade"). At block 512, the edge cache server 106b determines whether it already has the requested manifest file. If the edge cache server 106b already has the manifest file, the flow may proceed to block 523 to create a port forwarding rule on the edge cache server 106b, which will be discussed below.

If the edge cache server 106b does not have the requested manifest file, at block 513, the edge cache server 106b sends an HTTP GET request message for the manifest file to the mid-tier cache server 106a. The message also indicates for the connection between the edge cache server 106b and the mid-tier cache server 106a to be upgraded from HTTP/1 to HTTP/2. At block 514, the mid-tier cache server 106a sends a "101" response to the edge cache server 106b indicating that the connection is upgraded to HTTP/2. At block 515, the mid-tier cache server 106a determines whether it already has the requested manifest file. If the mid-tier cache server 106a already has the manifest file, the flow may proceed to block 520 to generate a port forwarding rule on the mid-tier cache server 106a, which will be discussed below.

If the mid-tier cache server 106a does not have the requested manifest file, at block 516, the edge cache server 106b sends an HTTP GET request message for the manifest file to the origin server 102, also indicating for the connection between the mid-tier cache server 106a and the origin server 102 be upgraded to HTTP/2. At block 517, the origin server 102 sends a "101" response to the mid-tier cache server 106a indicating that the connection is upgraded to HTTP/2. At block 518, the origin server 102 sends a "200 OK" response message comprising the manifest file back to the mid-tier cache server 106a.

At block 519, the mid-tier cache server 106a caches (e.g., stores) the manifest file in its storage. The stored manifest file may be later sent by the mid-tier cache server 106a to other requesting edge cache servers 106b, mid-tier cache servers 106a, and/or clients 108. At block 520, the mid-tier cache server 106a generates an IP layer rule (e.g., a port forwarding rule in iptables for Linux) for future data objects, associated with the edge cache server 106b and/or client 108, from the origin server 102 to be forwarded at the mid-tier cache server's 106a IP layer to the edge cache server 106b, as well as forwarded to the mid-tier cache server's 106a application for potential storage. Such future data objects may be associated with the manifest file (i.e., the initially requested data object), such as video segments (which may be indicated in the manifest file). The IP layer rule, for example, may cause a future data object from the origin server 102 to be forwarded at the IP layer to a downstream network interface port of the mid-tier cache server 106a that is associated with the edge cache server 106b. The network interface port may be associated with the mid-tier cache server's 106a connection with the edge cache server 106b. That is, this network interface port may be the network interface port used by the mid-tier cache server 106a in its connection with the edge cache server 106b. The IP layer rule may indicate, as a correlated pair, the upstream (e.g., incoming) network interface port (e.g., as a network socket or link) via which the manifest file any/or future data objects are received from the origin server 102 and the downstream network interface port (e.g., as a network socket or link). The IP layer rule may be triggered when a future data object is received on the upstream network interface port.

In a TCP layer approach, a TCP layer rule may be generated instead of an IP layer rule. The TCP layer rule may cause the future data objects to be forwarded via the TCP layer to the downstream network interface port associated with the edge cache server 106b and/or the mid-tier cache server's 106a connection to the edge cache server 106b. For example, the TCP layer rule may modify the HTTP header information of a future data object by incrementing the stream ID associated with the connection between the mid-tier cache server 106a and the edge cache server 106b.

At block 521, the mid-tier cache server 106a sends a "200 OK" response message comprising the manifest file to the edge cache server 106b. This is in response to the earlier request for the manifest file in block 513. It will be noted that the actions associated with blocks 519, 520, and 521 may be performed in any order and/or concurrently (at least in part).

The actions at the edge cache server 106*b* associated with blocks 522, 523, and 524 may be similar to those at the mid-tier cache server 106*a* associated with blocks 519, 520, and 521, respectively. At block 522, the edge cache server 106*b* caches (e.g., stores) the manifest file that was previously received from the mid-tier cache server 106*a*. The manifest file may be sent to additional clients 108 (as well as potentially other cache servers 106) requesting the manifest file.

At block 523, the edge cache server 106*b* generates an IP layer rule (e.g., a port forwarding rule in iptables in Linux) to cause future data objects received from the origin server 102 (and associated with the client 108) to be forwarded at the edge cache server's 106*b* IP layer to the client 108, as well as cause the future data objects to be forwarded to the edge cache server's 106*b* application for potential storage. The future data objects may be associated with the manifest file, such as video segments of the video stream associated with the manifest file. The IP layer rule, for example, may cause a future data object from the mid-tier cache server 106*a* to be forwarded at the IP layer to a downstream network interface port of the edge cache server 106*b* that is associated with the client 108. The downstream network interface port may be associated with the edge cache server's 106*b* connection with the client 108. That is, this network interface port may be the network interface port used by the edge cache server 106*b* in its connection with the client 108. The IP layer rule may indicate, as a correlated pair, the upstream (e.g., incoming) network interface port (e.g., as a network socket or link) via which the manifest file any/or future data objects are received from the mid-tier cache server 106*a* and the downstream network interface port (e.g., as a network socket or link). The IP layer rule may be triggered when a future data object is received on the upstream network interface port.

In a TCP layer approach, a TCP layer rule may be generated instead of an IP layer rule. The TCP layer rule may cause the future data objects to be forwarded via the TCP layer to the downstream network interface port associated with the client 108 and/or the edge cache server's 106*b* connection to the client 108. For example, the TCP layer rule may modify the HTTP header information of a future data object by incrementing the stream ID associated with the connection between the edge cache server 106*b* and the client 108.

It will be appreciated that the IP layer rule (or the TCP layer rule, if such is the case) on the edge cache server 106*b* may be generated by the application running on the edge cache server 106*b*. For example, the application may determine that the upstream network interface port via which the edge cache server 106*b* is connected to the mid-tier cache server 106*a* (and via which the edge cache server 106*b* received the manifest file) and the downstream network interface port via which the edge cache server 106*b* is connected to the client are correlated to one another. The application may be better positioned (relative to the processes at the TCP layer, IP layer, ethernet layer, and physical layer) to determine such a correlation since the processes at the IP layer and TCP layer, for example, would not typically be aware of or have access to (e.g., due to encapsulation) both the downstream network interface port and the upstream network interface port to make such a correlation. In addition, the application may maintain information on the particular data objects being requested by and/or sent to the various clients 108. For example, the application may be able to determine which connected clients 108 are currently receiving, or are about to receive, a particular video stream.

Based on determining that several clients 108, for example, are receiving, or are about to receive, a common video stream, the application may generate one or more IP layer rules that reflect as such and cause a received data object (e.g., a video segment) associated with the video stream to be copied (e.g., "forked") to the respective downstream network interface ports associated with the several clients 108. Again, the processes at the IP layer and TCP layer, for example, would not typically have sufficient knowledge about the data objects (e.g., due to encapsulation) to determine that any two data objects are associated with a common video stream. For similar reasons, the IP layer rule (or the TCP layer rule, if such is the case) generated on the mid-tier cache server 106*a* at block 520 may be generated by the application on the mid-tier cache server 106*a*, rather than by one or more processes at the IP layer or TCP layer of the mid-tier cache server 106*a*.

At block 524, the edge cache server 106*b* sends a "200 OK" response message comprising the manifest file to the client 108. This is in response to the earlier request for the manifest file in block 510. The actions associated with blocks 522, 523, and 524 may be performed in any order and/or concurrently (at least in part). The client 108 may receive the manifest file and the application running on the client 108 may process the manifest file. For example, the application may cause the client 108 to send a request to the edge cache server 106*b* for one or more video segments indicated in the manifest file. Additionally or alternatively, in instances where HTTP/2 server push is used, the application may prepare to receive one or more pushed video segments. and/or wait a certain period of time for an appropriate PUSH_PROMISE frame to be received before actively sending out a request for a video segment.

FIG. 6 illustrates a flow diagram of a method 600 relating to network data routing, such as in the context of the CDN (e.g., the CDN 104 of FIG. 1). The CDN may be single-tiered or multi-tiered. The CDN may be generally configured to facilitate video distribution to various client devices for viewer consumption.

At step 602, a cache server (e.g., an edge cache server 106*b* or a mid-tier cache server 106*a* of FIG. 1) receives, from a client device (e.g., a client 108 of FIG. 1), a first request for a first data object. The first data object may be associated with a video stream, such as a manifest file or a video segment of the video stream. The first request may cause an HTTP/2 connection to be established with the cache server.

The cache server may comprise an application (e.g., an HTTP web server) that implements, at the application layer, various functions and operations to, for example, manage and coordinate (at least in part) web traffic through the cache server, respond to data requests from client devices and other cache servers, make data requests to other cache servers and the origin server, and manage the storage of data objects that are anticipated to be requested by various client devices or other cache servers. For example, the application may determine whether a data object received by the cache server is already stored at the cache server and, if not, cause the cache server to store the data object so that it may be provided to any requesting client device or other cache servers. The application may also track the various client devices connected to the cache servers and their respective data streams from or through the cache server. For example, the application may know that one client device is receiving a particular video stream and another client device is receiving another (or the same) particular video stream. In this manner, the application may determine that multiple client devices are all receiving the same video stream. For example, the users of the multiple client devices may all be watching the same streamed television channel or program.

At step 604, the cache server sends a second request for the first data object to an origin server (e.g., the origin server 102 of FIG. 1). The origin server may be generally associated with a content provider. For example, in the context of video distribution, the origin server may comprise a video source configured to provide the video segments (and associated data, such as manifest files) of various video streams. The origin server may comprise an encoder/transcoder that encodes and otherwise packages the video segments of a video stream based on raw video data received from a video feed (e.g., live video feed). The second request for the first data object may cause an HTTP/2 connection to be established between the cache server and the origin server. Additionally or alternatively, the cache server may send the second request for the first data object to a second (upstream) cache server (e.g., a mid-tier cache server).

At step 606, the cache server receives the requested first data object from the origin server (and/or the second upstream cache server). For example, the first data object may be sent by the origin server, and likewise received by the cache server, via the HTTP/2 connection and an HTTP/2 response message. The cache server may receive the first data object via an upstream network interface port (e.g., a network socket or link) of the cache server. The upstream network interface port may be associated with the cache server's connection with the origin server.

At step 608, the cache server determines (e.g., generates) an Internet layer rule (e.g., a rule) configured to cause future data object(s) received by the cache server to be forwarded to the client device via the Internet layer (e.g., the IP layer) of the cache server. The future data object(s) may be received from the origin server (and/or the second upstream cache server). The Internet layer rule may be implemented at the Internet layer of the cache server. The future data object(s) may be associated with the first data object. For example, the first data object may comprise a manifest file associated with the video stream and the future data object(s) may comprise video segments of the video stream. The future data object(s) may be received by the cache server via an HTTP/2 server push method from the origin server (and/or the second upstream cache server). Additionally or alternatively, the cache server may determine a transport layer rule configured to cause the future data object(s) to be forwarded to the client device via the transport layer (e.g., the TCP layer) of the cache server.

The Internet layer rule may comprise one or more rules or rule entries in a port forwarding table (e.g. in a kernel module, utility, program, etc.). For example, under Linux, the Internet layer rule may be determined by generating (or modifying) one or more rules or rule entries in the iptables utility. The ip6tables (for IPv6 ) or nftables utilities may be additionally or alternatively used. Similar utilities may be used under other operating systems. The term "Internet layer rule" (or rule, generally) may refer to a single rule or multiple rules collectively. That is, multiple associated rules may be collectively considered as a single rule.

The Internet layer rule may be configured to cause the future data object(s) to be forwarded to the client device by causing the future data object(s) to be forwarded, via the Internet layer, to a downstream network interface port of the cache server that is associated with the client device. For example, the cache server's connection with the client device may be via the downstream network interface port. The cache server may have received the first request for the first data object from the client device via the downstream network interface port. The Internet layer rule may indicate an association (e.g., a correlation) between the upstream network interface port (e.g., via which future data objects from the origin server are anticipated to be received) and the downstream network interface port (e.g., via which future data objects are anticipated to be sent to the client device). The Internet layer rule may be configured to cause the future data object(s) to be forwarded to the downstream network interface port based on the cache server receiving the future data object(s) via the upstream network interface port. For example, the Internet layer rule may be triggered, activated, etc., based on the cache server receiving the future data object(s) via the upstream network interface port. The cache server may forward the future data object(s) to the downstream network interface port by causing a binary copy of the future data object(s) to be written to the downstream network interface port. That is, the Internet layer rule may be configured to cause a binary copy of the of the future data object(s) to be written to the downstream network interface port.

The Internet layer rule may be determined by the application (e.g., an HTTP web server) on the cache server. For example, as noted above, the application may track the various data objects requested by and sent to the client device (and other client devices). The application may thus know the downstream and/or upstream network interface ports associated with each client device. The application may thus indicate the association, with respect to the client device, between the downstream network interface port and the upstream network interface port in the Internet layer rule, such as in the form of matched pair.

The Internet layer rule may be additionally or alternatively configured to cause the future data object(s) to be forwarded to the application on the cache server. The Internet layer rule may be configured to cause the future data object(s) to be forwarded to the application after the future data object(s) are forwarded to the client device via the Internet layer. As noted, the application may be configured to store the future data object(s) at the cache server if the future data object(s) are not already stored at the cache server. The future data object(s) may be stored at the cache server so that the cache server may send them to any subsequent requesting client devices. Forwarding the future data object(s) to the application may have the additional benefit of enabling the application to track the data objects that the cache server forwards to the client device, despite the fact that the application may not process or otherwise act upon the data objects (besides this and/or the storage function).

Alternatively, the Internet layer rule may be configured to cause signaling/messaging data associated with the future data object(s) to be sent to the application layer without the data object being sent to the application layer or with only a portion of the data object being sent to the application layer (e.g., without the data object payload). Such signaling/messaging data may be based on or indicated in header and/or trailer information associated with the data object, for example. The signaling/messaging data may be used by the application to track the data objects from the origin server that are forwarded to the client device.

With the Internet layer rule in place, the cache server may receive a second data object (e.g., a "future" data object referred to above) from the origin server (and/or the second cache server). The second data object may be associated with the first data object. For example, the first data object may be a manifest file and the second data object may be a video segment indicated in the manifest file. The second data object may be received from the origin server via a server push method (e.g., HTTP/2 server push). The cache server may forward, based on the Internet layer rule, the second data object to the client device via the Internet layer of the cache server. For example, the second data object may be received via the upstream network interface port associated with the client device. Based on the association of the upstream network interface port with the downstream network interface port indicated in the Internet layer rule, the second data object may be forwarded, via the Internet layer, to the downstream network interface port, and thus to the client device.

The method 600 may be also applied or extended to effect data delivery to multiple client devices, such as by the cache server "forking" a data object (received from the origin server) at its Internet layer to the client devices based on respective Internet layer rules associated with the client devices. For example, the cache server may receive a third request for the first data object from a second client device. For example, the second client device may request the same manifest file as the initial client device. That is, the initial client device and the second client devices may both want to receive the same video stream. Additionally or alternatively, the manifest files may be different per se but still associated with the same video stream. The cache server may determine a second Internet layer rule (associated with the second client device) configured to cause the one or more future data objects to be forwarded, via the Internet layer of the cache server, to the second client device. The second Internet layer rule may be analogous to the initial Internet layer rule associated with the initial client device.

The cache server may receive a second data object (e.g., a "future" data object referred to above) from the origin server, such as via a server push method. The second data object may be associated with the first data object. For example, the first data object may comprise a manifest file and the second data object may comprise a video segment of the video stream. Based on the initial Internet layer rule and the second Internet layer rule, the cache server may forward, via the Internet layer of the cache server, the second data object to both the initial client device and the second client device.

The techniques described in relation to the method 600 may be similarly applied in the context of a multi-tier CDN. For example, taken from the perspective of an edge cache server, in step 604, the edge cache server may send the second request for the first data object to an upstream mid-tier cache server, rather than to an origin server. In step 606, the edge cache server may receive the first data object from the mid-tier cache server, again rather than from the origin server. In step 608, the referenced future data object(s) may be received by the edge cache server from the mid-tier cache server, rather than from the origin server.

Or, for example, taken from the perspective of a mid-tier cache server, in step 602, the mid-tier cache server may receive the request for the first data object from a downstream edge cache server or another mid-tier cache server, rather than from a client device. In step 604, the mid-tier cache server may send the second request for the first data object to the origin server or, if such is the case, to another mid-tier cache server upstream from the instant mid-tier cache server. In step 606, the first data object may be received from the origin server or, if such is the case, from the upstream other mid-tier cache server. In step 608, the referenced future data object(s) may be received from the origin server or, if such is the case, from the upstream other mid-tier cache server. The Internet layer rule may be configured to cause the future data object(s) to be forwarded to the edge cache server or to the downstream other mid-tier cache server, as the case may be, rather than to a client device.

FIG. 7 illustrates a flow diagram of a method 700 relating to network data routing, such as in the context of the CDN (e.g., the CDN 104 of FIG. 1). The CDN may be single-tiered or multi-tiered. The CDN may be generally configured to facilitate video distribution to various client devices for viewer consumption.

At step 702, a cache server (e.g., an edge cache server 106*b* or a mid-tier cache server 106*a* of FIG. 1) receives, from an origin server (e.g., the origin server 102 of FIG. 1), a first data object to be forwarded to a first client device (e.g., a client 108 of FIG. 1). The first data object may have been earlier requested by the first client device. Additionally or alternatively, the first data object may be received from a second (upstream) cache server (e.g., a mid-tier cache server).

At step 704, the cache server determines a first Internet layer rule (e.g., a first rule) configured to cause future data object(s) received by the cache server to be forwarded, via an Internet layer of the cache server, to the first client device. Determining the first Internet layer rule may be based on receiving the first data object. For example, the first Internet layer rule may be based on the upstream network interface port of the cache server via which the first data object was received. The future data object(s) may be associated with the first data object. The Internet layer rule may be implemented at the Internet layer of the cache server.

At step 706, the cache server receives, from the origin server (and/or the second cache server), a second data object to be forwarded to a second client device. The second data object may have been earlier requested by the second client device. The first and second data objects may be associated with one another. For example, both may be manifest files associated with the same video stream. The first and second data objects may refer to the same data object. For example, both the first and second data object may refer to the same manifest file. Or there may be some timing difference between the two manifest files and/or one may reference some video segments or ad insertions that are not referenced in the other, despite both manifest files being associated with the same video stream.

At step 708, the cache server determines a second Internet layer rule (e.g., a second rule) configured to cause the future data object(s) received by the cache server to be forwarded, via the Internet layer of the cache server, to the second client device. Determining the second Internet layer rule may be based on receiving the second data object. For example, the second Internet layer rule may be based on the upstream network interface port of the cache server via which the second data object was received. The second data object may also be associated with the future data object(s). That is, the future data objects may be associated with both the first and second data objects. For example, the future data objects may be video segments of a video stream and the first and second data objects may be manifest files associated with the video stream.

At step 710, the cache server receives the future data object(s) from the origin server (and/or the second cache server). For example, the future data object(s) may have been sent via a server push method from the origin server (and/or the second cache server).

At step 712, the cache server forwards, via the Internet layer of the cache server, the future data object(s) to the first and second client devices based on the respective first and second Internet layer rules. For example, forwarding the future data object(s) to the first client device may comprise forwarding the one or more future data object(s) to a first downstream network interface port associated with the first client device and indicated in the first Internet layer rule and forwarding the future data object(s) to the second client device may comprise forwarding the one or more future data object(s) to a second downstream network interface port associated with the second client device and indicated in the second Internet layer rule. The first data object may have been forwarded to the first client device via the first downstream network interface port and the second data object may have been forwarded to the second client device via the second network interface port.

The future data object(s), as well as the first and second data objects, may have been received via an upstream network interface port of the cache server associated with the connection with the origin server (and/or the second cache server). The first and second Internet layer rules may indicate the upstream network interface port. The application on the cache server may have configured the first Internet layer rule to indicate the upstream network interface port based on determining that the first data object was received from the origin server via the upstream network interface port. Likewise, the application on the cache server may have configured the second Internet layer rule to indicate the upstream network interface port based on determining that the second data object was received from the origin server via the upstream network interface port The first Internet layer rule may indicate the upstream network interface port (and/or IP address of the origin server) as a mapping with the first downstream network interface port (and/or IP address of the first client device), such that future data objects received via the upstream network interface are forwarded, via the Internet layer, to the first downstream network interface port. Similarly, the second Internet layer rule may indicate the upstream network interface port (and/or IP address of the origin server) as a mapping with the second downstream network interface port (and/or IP address of the second client device), such that future data objects received via the upstream network interface are forwarded, via the Internet layer, to the second downstream network interface port. The cache server may determine that the future data object(s) are received via the upstream network interface port and forward the future data object(s) to the first and second client devices (e.g., to the first and second downstream network interface ports, respectively) based on such a determination.

One or both of the first and second Internet layer rules may be further configured to cause the future data object(s) to be forwarded to the application on the cache server. One or both of the first and second Internet layer rules may be configured to cause the future data object(s) to be forwarded to the application after the future data object(s) are forwarded to the first and second client devices via the Internet layer. The application may determine if the future data object(s) are stored at the cache server and, if not, store them. The first and second Internet layer rules may be collectively configured to cause each future data object to be forwarded only once to the application for potential storage. Alternatively, one or both of the first and second Internet layer rules may be configured to cause signaling/messaging data associated with the future data object(s) to be forwarded to the application rather than forwarding the whole data object.

In some cases, the first and second data objects may be associated with a different transport protocol than that associated with the future data object(s). For example, the first and second data objects may be requested by the respective first and second client devices via a TCP connection with the cache server and/or the cache server may request and receive the first and second data objects from the origin server and/or second cache server via a TCP connection. However, the future data object(s) may be sent from the origin server and/or second cache server to the cache server via UDP or SCTP and/or likewise from the cache server to the first and second client devices.

It is possible, due to process scheduling in the cache server's operating system or other timing idiosyncrasies, and particularly where the first and second client devices initially request the same data object (i.e., the first and second data objects refer to the same data object), that the initial request for the second data from the second client device is held in queue at the cache server (e.g., the application on the cache server) because the cache server had already received the initial request from the first client device for the first data object and requested the first data object from the origin server and/or second cache server. In this unusual case, the application on the cache server may determine that the second client device's request for the second data object is waiting in the application's queue and determine the second Internet layer rule associated with the second client device accordingly.

Figure 8:
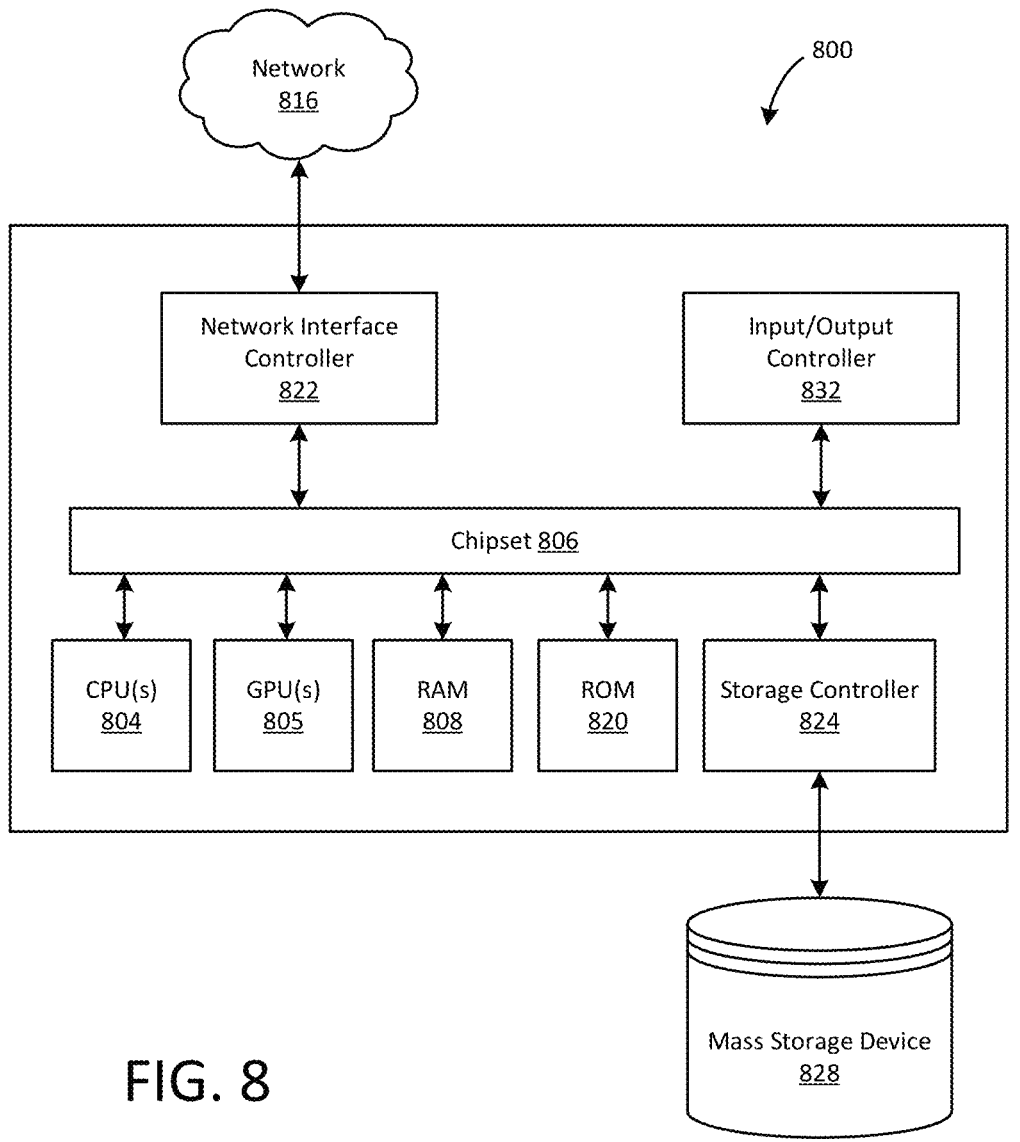
FIG. 8 is a block diagram of an example computing device.

FIG. 8 depicts an example computing device in which the systems, methods, and devices disclosed herein, or all or some aspects thereof, may be embodied. For example, components such as the origin server 102, a mid-tier cache server 106a, an edge cache server 106b, and a client 108 of FIG. 1 may be implemented generally in a computing device, such as the computing device 800 of FIG. 8. The computing device of FIG. 8 may be all or part of a server, workstation, desktop computer, laptop, tablet, network appliance, PDA, e-reader, digital cellular phone, set top box, or the like, and may be utilized to implement any of the aspects of the systems, methods, and devices described herein.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may further provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 825 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 828 by detecting the physical states or characteristics of one or more particular locations within the physical storage units.

In addition to the mass storage device 828 described above, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described above. The computing device 800 may have access to computer-readable storage media storing computer-executable instructions, which, when executed by the computing device 800, may perform the methods described herein.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the systems, methods, and devices are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described systems, methods, and devices. When combinations, subsets, interactions, groups, etc., of these components are described, it is understood that while specific references to each of the various individual and collective combinations and permutations of these may not be explicitly described, each is specifically contemplated and described herein, for all systems, methods, and devices. This applies to all aspects of this application including, but not limited to, operations in described methods. Thus, if there are a variety of additional operations that may be performed it is understood that each of these additional operations may be performed with any specific embodiment or combination of embodiments of the described methods.

As will be appreciated by one skilled in the art, the systems, methods, and devices may take the form of an entirely hardware embodiment, an entirely software embodiment, or an embodiment combining software and hardware aspects. Furthermore, the systems, methods, and devices may take the form of a computer program product on a computer-readable storage medium having computer-readable program instructions (e.g., computer software) embodied in the storage medium. More particularly, the present systems, methods, and devices may take the form of web-implemented computer software. Any suitable computer-readable storage medium may be utilized including hard disks, CD-ROMs, optical storage devices, or magnetic storage devices.

Embodiments of the systems, methods, and devices are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the systems, methods, and devices have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

The invention claimed is:

1. A method comprising:
   receiving, by a first server associated with a content delivery network (CDN) and from a client device, a request for a first data object; and
   based on receiving, by the first server, the first data object, causing one or more future data objects, associated with the first data object and received by the first server, to be forwarded automatically to the client device via a sub-application layer without a need for the future data objects to traverse an application layer.

2. The method of claim 1, wherein the first server comprises a cache server.

3. The method of claim 1, wherein causing the one or more future data objects to be forwarded automatically to the client device via the sub-application layer without the need for the future data objects to traverse the application layer comprises causing the one or more future data objects to be forwarded, via the sub-application layer, to a downstream network interface port of the first server that is associated with the client device.

4. The method of claim 3, further comprising:
   determining an association, with respect to the first data object and the one or more future data objects, between the downstream network interface port and an upstream network interface port of the first server that is associated with a second server, wherein causing the one or more future data objects to be forwarded to the downstream network interface port is based on the first server receiving the one or more future data objects from the second server via the upstream network interface port.

5. The method of claim 1, wherein causing the one or more future data objects to be forwarded automatically to the client device via the sub-application layer without the need for the future data objects to traverse the application layer comprises causing a binary copy of the one or more future data objects to be written, at the sub-application layer, to a downstream network interface port of the first server that is associated with the client device.

6. The method of claim 1, further comprising causing the one or more future data objects to be forwarded to an application via the application layer, wherein the application is configured to store the one or more future data objects at the first server if the first server does not already store the one or more future data objects.

7. The method of claim 6, wherein the application comprises an HTTP web server.

8. The method of claim 1, wherein the first data object comprises a manifest file associated with a video stream and at least one of the one or more future data objects comprises a video segment of the video stream.

9. The method of claim 1, wherein the one or more future data objects are received by the first server via a server push method from a second server.

10. A method comprising:
    receiving, by a first server associated with a content delivery network (CDN) and from a client device, a request for a first data object;
    sending, by the first server and based on application layer processing of the first data object, the first data object to the client device; and
    causing one or more future data objects, associated with the first data object and received by the first server, to be forwarded automatically to the client device via a sub-application layer.

11. The method of claim 10, wherein the first server comprises a cache server.

12. The method of claim 10, wherein causing the one or more future data objects to be forwarded automatically to the client device via the sub-application layer comprises causing the one or more future data objects to be forwarded, via the sub-application layer, to a downstream network interface port of the first server that is associated with the client device.

13. The method of claim 12, further comprising:
    determining an association, with respect to the first data object and the one or more future data objects, between the downstream network interface port and an upstream network interface port of the first server that is associated with a second server, wherein
    causing the one or more future data objects to be forwarded to the downstream network interface port is based on the first server receiving the one or more future data objects from the second server via the upstream network interface port.

14. The method of claim 10, wherein causing the one or more future data objects to be forwarded automatically to the client device via the sub-application layer comprises causing a binary copy of the one or more future data objects to be written, at the sub-application layer, to a downstream network interface port of the first server that is associated with the client device.

15. The method of claim 10, further comprising causing the one or more future data objects to be forwarded to an application via an application layer, wherein the application is configured to store the one or more future data objects at the first server if the first server does not already store the one or more future data objects.

16. The method of claim 15, wherein the application comprises an HTTP web server.

17. The method of claim 10, wherein the first data object comprises a manifest file associated with a video stream and at least one of the one or more future data objects comprises a video segment of the video stream.

18. The method of claim 10, wherein the one or more future data objects are received by the first server via a server push method from a second server.

19. A method comprising:

based on receiving, by a first server associated with a content delivery network (CDN), a first data object to be forwarded to a first client device, causing one or more future data objects, received by the first server, to be forwarded automatically to the first client device via a sub-application layer without a need for the future data objects to traverse an application layer; and based on receiving, by the first server, a second data object to be forwarded to a second client device, causing the one or more future data objects, received by the first server, to be forwarded automatically to the second client device via the sub-application layer without the need for the future data objects to traverse the application layer, wherein the one or more future data objects are associated with the first and second data objects.

20. The method of claim 19, wherein:

causing the one or more future data objects to be forwarded automatically to the first client device comprises forwarding the one or more future data objects to a first downstream network interface port of the first server associated with the first client device, and causing the one or more future data objects to be forwarded automatically to the second client device comprises forwarding the one or more future data objects to a second downstream network interface port of the first server associated with the second client device.

21. The method of claim 19, further comprising:

determining, by the first server, that the one or more future data objects are received via an upstream network interface port of the first server, wherein causing the one or more future data objects to be forwarded automatically to the first and second client devices is further based on the determining that the one or more future data objects are received via the upstream network interface port of the first server.

22. The method of claim 19, further comprising causing the one or more future data objects to be forwarded to an application via the application layer, wherein the application is configured to store the one or more future data objects at the first server if the first server does not already store the one or more future data objects.

23. The method of claim 19, wherein the first data object comprises a first manifest file associated with a video stream, the second data object comprises a second manifest file associated with the video stream, and at least one of the one or more future data objects comprises a video segment of the video stream.

24. The method of claim 19, wherein the one or more future data objects are received by the first server via a server push method from a second server.

* * * * *